(12) United States Patent  
Gau

(10) Patent No.: US 12,346,098 B2  
(45) Date of Patent: Jul. 1, 2025

(54) INDUSTRIAL PLANT OPTIMIZATION

(71) Applicant: BASF SE, Ludwigshafen (DE)

(72) Inventor: Sebastian Gau, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 475 days.

(21) Appl. No.: 17/782,765

(22) PCT Filed: Dec. 8, 2020

(86) PCT No.: PCT/EP2020/085133  
§ 371 (c)(1),  
(2) Date: Jun. 6, 2022

(87) PCT Pub. No.: WO2021/116126  
PCT Pub. Date: Jun. 17, 2021

(65) Prior Publication Data  
US 2023/0008064 A1  Jan. 12, 2023

(30) Foreign Application Priority Data  
Dec. 13, 2019 (EP) ..................................... 19216211

(51) Int. Cl.  
*G05B 19/418* (2006.01)

(52) U.S. Cl.  
CPC . *G05B 19/41855* (2013.01); *G05B 19/41885* (2013.01)

(58) Field of Classification Search  
CPC ........ G05B 19/41855; G05B 19/41885; G06Q 10/06  
See application file for complete search history.

(56) References Cited

U.S. PATENT DOCUMENTS

2017/0192414 A1* 7/2017 Mukkamala .......... H04L 43/045  
2017/0315795 A1* 11/2017 Keller ................. G06F 11/3006  
(Continued)

FOREIGN PATENT DOCUMENTS

WO   WO-2018/203886 A1   11/2018  
WO   WO-2019/211288 A1   11/2019

OTHER PUBLICATIONS

International Application No. PCT/EP2020/085133, International Search Report and Written Opinion, mailed Feb. 11, 2021.

*Primary Examiner* — Kidest Bahta  
(74) *Attorney, Agent, or Firm* — Lowenstein Sandler LLP

(57) ABSTRACT

The present teachings relate to a method comprising: receiving at a user container runtime environment, via a container registry, an image of an obfuscated containerized model of an asset; wherein the containerized model comprises an API, and wherein the containerized model has been generated in a supplier runtime environment located within a supplier network environment, interfacing, with a model execution logic, the API of the containerized model image, wherein the interface comprises a process data signal that is transmitted to the API of the model image, and a model result data signal that is transmitted from the API of the model image; wherein the process data signal comprises data related to the usage conditions of the asset, and the model result signal is indicative of the response of the asset to at least some of the usage conditions, wherein the user container runtime environment is located within a user network environment which is isolated from the supplier network environment. The present teachings also relate to a method for transmitting a model of an asset, a method for transmitting an augmented model, a computer software product and a computer network arrangement.

15 Claims, 3 Drawing Sheets

(56) References Cited

U.S. PATENT DOCUMENTS

2019/0102280 A1\* 4/2019 Caldato .................. G06F 9/455
2020/0050163 A1\* 2/2020 Ludwig .............. G05B 19/4185
2020/0387818 A1\* 12/2020 Chan ................ G06Q 10/06395

\* cited by examiner

INDUSTRIAL PLANT OPTIMIZATION

CROSS-REFERENCE TO RELATED APPLICATIONS

This is the U.S. national phase of International Application No. PCT/EP2020/085133, filed Dec. 8, 2020, which claims the benefit of European Patent Application No. 19216211.3, filed Dec. 13, 2019.

TECHNICAL FIELD

The present teachings relate generally to computer-based optimization of an industrial plant.

BACKGROUND ART

Industrial plants such as process plants comprise equipment that is operated to produce one or more industrial products. The equipment may, for example, be machinery and/or heat exchangers that require monitoring and maintenance. A requirement for maintenance can depend on several factors that include operation time and/or load on the equipment, environmental conditions that the equipment has been exposed to, and so forth. Undue or unplanned shutdown of the equipment is generally not desired as it often results in a stoppage of production, which can reduce the efficiency of the plant and can cause wastage. Since the time period between two maintenances can vary, it may be difficult to plan the shutdown of the equipment around the time when the maintenance is actually necessary. Additionally, safety is of high importance in industrial plants. In order to prevent unsafe conditions from occurring, different equipment or parts of the plant may be monitored.

For example, an industrial plant such as a chemical plant may comprise equipment such as reactors, storage tanks, heat exchangers, compressors, valves, etc., which are monitored using sensors.

Plant equipment is often sourced from multiple external suppliers or manufacturers of the equipment. Some suppliers may even generate a computer model of their equipment. The computer model may be useful for estimating the health of the equipment and for forecasting its maintenance requirements. In some cases, the model may even be capable of determining optimized operating parameters in response to the specific inputs. The latter use can also be of significant interest to the plant operator as the operator can thus use the model to optimize the operation of the equipment or plant. The model may even be helpful in determining safe conditions for the equipment.

The model may however comprise proprietary information or intellectual property of the supplier, which may not be desirable for the supplier to be exposed to a third-party. The plant operator is usually interested only in the use of the model, i.e., model output in response to specific inputs. A deep knowledge behind the logic of the model might not be required by the plant operator for the purpose of benefiting from the model. Generating an accurate model may require significant effort and resources, so if the supplier is reluctant to exposing their know-how to third parties, they may avoid developing good models to mitigate the risk of leaking knowhow to third parties.

A similar problem can also exist from the perspective of the plant operator. The industrial plant or even a specific plant equipment may generate a large amount of data when deployed in the plant. The data may have been collected and stored in one or more databases over a long period of time. The data often comprises valuable information regarding response of the plant and/or equipment to different conditions. The data can be used, for example, to train machine learning ("ML") models. Such ML models can be usable for predictions, safety enhancement, optimization, etc. The plant operator may not be willing to provide access to their plant- and/or equipment-data to external parties, including the supplier.

There is thus a requirement for a method for monitoring an industrial plant equipment that enhances security for the model supplier and the model user.

SUMMARY

At least some of the problems inherent to the prior-art will be shown solved by the subject-matter of the accompanying independent claims.

When viewed from a first perspective there can be provided a method comprising:
 receiving at a user container runtime environment, via a container registry, an image of an obfuscated containerized model of an asset; wherein the containerized model comprises an API, and wherein the containerized model has been generated in a supplier runtime environment located within a supplier network environment,
 interfacing, with a model execution logic, the API of the containerized model image, wherein the interface comprises a process data signal that is transmitted to the API of the model image, and a model result data signal that is transmitted from the API of the model image; wherein the process data signal comprises data related to the usage conditions of the asset, and the model result signal is indicative of the response of the asset to at least some of the usage conditions,
wherein the user container runtime environment is located within a user network environment which is isolated from the supplier network environment.

It will be understood that from the model result signal as generated using the proposed computer-implemented method, at least one estimated value related to the behavior of the asset can be determined, whilst preserving data protection of the model as well as process data received as the process data signal. Moreover, deployment of the model on the user side can also be simplified.

According to an aspect, the asset is an equipment, for example, reaction chamber, heat exchanger, compressor, valve, sensor, etc. In some cases, the asset can even be a group of equipment, for example, steam-cracker, distillation unit, boiler, cooling tower, etc. According to another aspect, the asset is a product that is produced by a plant. The product can for example be a chemical product, a pharmaceutical product, or even any material that is used as a raw material by another plant in a value-chain. To name a few non-limiting examples; the product can be a polymer, an additive, an emulsion, a catalyst, etc.

For equipment, the usage conditions may be the operating conditions for the equipment, such as inputs that the equipment receives. As a non-limiting example, for a steam boiler, usage conditions or operating conditions can be input conditions such as inlet water temperature and inlet water flow rate. Additionally, the operation conditions may also include ambient conditions such as ambient temperature. Additionally, the operating conditions may also include control conditions, such as controller set-points, for example, required steam outlet flow, outlet temperature, etc.

For product, the usage conditions may be parameters under which the product was produced.

In most production processes, tolerances exist for the end-product or the product produced. As a result, there can almost always be variation in the quality of the product. The conditions or parameters under which the product is produced can vary dependent upon time, for example, variations in temperature, pressure, amount of raw materials and so forth during production and/or storage can have a bearing on the specifications that the end-product. Moreover, each of the parameters may be independent of at least some of the others, which result in the variation in the end-product specifications. For critical products, the tolerances are usually tight to make sure that the user of the product can get a product with consistent specifications. Tight tolerances often mean a more expensive production process and/or more wastage as the product batch lying outside the tolerance range may have to be discarded. The applicant has realized that instead of maintaining tight tolerances, at least in some applications, the usage conditions or production parameters of the product can be transmitted to a relevant user in the value chain. The user can thus adapt the process to be able to use the product more effectively. This can thus result in reduced cost and/or wastage by relaxing the tolerance range of the product. The usage conditions can thus be, concentration, density, weight, viscosity, strength, purity, or any such one or more parameters related to the product. Alternatively, or in addition, the usage conditions may be conditions or parameters that influence the product. For example, such conditions can be one or more parameters such as: temperature, pressure, reaction time, or any other relevant parameter to which the product can be exposed to for use or further processing and/or for storage. The model result signal can thus be indicative of the response or behavior of the product when exposed to one or more usage conditions. The response can for example be indicative of one or more properties of the product, such as, composition, viscosity, density, structure, strength, etc.

The result signal may be used to determine operating conditions for the asset, for example, by providing one or more control settings. The asset can thus be operated in an optimized manner via the determined operating conditions, for example achieved by the one or more control settings.

Thus, according to an aspect, the method also comprises:
performing, in response to the model result data signal, at least one control operation on or via the asset.

This the containerized model may be used to either determine way in which the asset may be processed by performing the at least one control operation on the asset, or the asset may be used to perform the at least one control operation. Hence, the model can be used to leverage improvements at the user side without affecting data security of the model or that of the process data.

It will be appreciated that the present teachings can thus provide a technical solution for enhancing data security not only for the supplier, but also for the user. Aspects of the teachings that work synergistically include the obfuscated containerized model, the container registry, and the API that is adapted to: receive the process data signal; and provide model result data signal. At least these features can prevent an unauthorized access to the model, and an unauthorized access to the process data.

It will be clear that the term supplier is used to refer to the party that owns the model or the model logic. The term user is used to refer to the party that uses the model without requiring a detailed knowledge of the model logic. According to an aspect, the supplier can hence be the manufacturer of the equipment, and the user can be the buyer of the equipment or the plant operator that uses the equipment. The user can even be a party that is considering sourcing the equipment from the supplier. The model can thus even be used by the user to evaluate the suitability of the equipment on the user side prior to sourcing the equipment from the supplier. From the above it will be understood that when the asset is a product, the supplier may be the manufacturer of the asset, and the user may be the buyer or prospective buyer of the product.

It will be understood that the user container runtime environment is executed on a processing unit on the user side.

The user network environment is isolated from the supplier network environment at least in terms of access, i.e., the user network does not have access rights to the supplier network, similarly the supplier network does not have access rights to the user network. The network environments can be physically isolated as different networks located at different locations. The networks may even be isolated using security features such as one or more firewalls and/or other security means. Each of the network environments are thus a secure network.

As an example, more specifically when the asset is an equipment, there can be provided a method for monitoring and/or controlling a plant equipment, the method comprising:
receiving at a user container runtime environment, via a container registry, an image of an obfuscated containerized model of the equipment; wherein the containerized model comprises an API, and wherein the containerized model has been generated in a supplier runtime environment located within a supplier network environment,
interfacing, with a model execution logic, the API of the containerized model image, wherein the interface comprises a process data signal that is transmitted to the API of the model image, and a model result data signal that is transmitted from the API of the model image; wherein the process data signal comprises data related to the operating conditions of the equipment, and the model result signal is indicative of the response of the equipment to at least some of the operating conditions,
wherein the user container runtime environment is located within a user network environment which is isolated from the supplier network environment.

It will be understood that from the model result signal, at least one estimated value related to the condition of the equipment can be determined.

The container registry is preferably located within a shared environment. The shared environment is isolated from the user network environment and the supplier network environment at least in terms of access, i.e., the shared environment preferably has restricted or no access to the supplier network and/or the user network environments. The shared environment is however accessible by the from the user network environment and the supplier network environment. Although the user network environment may request access to the shared environment for receiving the image of the containerized model, the access is preferably secured via a multi-factor authentication, and/or any other secure access means to ensure that the container registry is not accessible by any unauthorized third party. According to an aspect the shared environment is located on the user side. The shared environment may be a virtualized isolated part of the user network environment. According to another aspect, the shared environment may be part of a cloud service which is secured via a multi-factor authentication, and/or any other secure access means to ensure that the container registry is not accessible by any unauthorized third party. According to yet another aspect, the shared environment is located on the supplier side. The shared environment may be a virtualized isolated part of the supplier network environment.

The applicant has realized the proposed teachings can provide a secure environment on the user side for the model that the supplier has developed for the asset. The risk of the logic of the model to be exposed on the user side can thus be reduced. Information or data security can thus be increased. In addition, any one or more of: the model execution logic, the process data signal and the model result signal can be secured on the user side without the information related to these being transmitted to the supplier side. Furthermore, an always active connection between the supplier network environment and the user network connection can be avoided, which can further improve security and isolation between the two networks. For example, the data related to the containerized model can either be an image of the containerized model itself which is transmitted to the container registry, or it may even be a flag signal indicating that a containerized model or a new version thereof is available. A signal may then be transmitted to the user container runtime environment, in response to which an image of the containerized model may be fetched either directly from model image already stored in the container registry, or the user environment may request that the model image be transmitted via the registry or the shared environment. Upon receipt of the model image within the user runtime environment, e.g., by pulling the image from the registry, the data connection to the shared environment may be disabled by either one or both by the user network environment and the supplier network environment, and the flag signal may be cleared. The data connection may be reestablished in response to a new flag signal indicating that a more recent version of the model is available. The flag signal may even exist as two separate signals, one each at the user side and the supplier side, i.e., a supplier flag signal indicating to the container registry that a new model is available, and a user flag signal for indicating to the user side that a new model is available in the container registry. Hence, by isolating the networks in this way in addition to executing and image of the obfuscated containerized model in a container runtime environment, the security can be synergistically improved both for the model logic from being exposed on the user side, and the model execution logic, process data and model results from being exposed outside the user network environment.

According to an aspect, the image of an obfuscated containerized model may be removed or deleted from the container registry after the image has been received at the user container runtime environment. For example, the user side or the user container runtime environment may provide a receipt signal or flag that the image has been received, in response of which the image may be removed from the container registry. The image in the registry may be automatically deleted by the registry, or the user side may delete upon receiving it at the user container runtime environment, or the supplier side may delete the image, for example in response to the receipt signal or flag. This can further protect the model from an unauthorized access.

According to an aspect, the obfuscated containerized model is provided via the container registry by transmitting data from the supplier network environment. According to an aspect the data related to the model is pushed to the container registry.

Similarly, when viewed from the supplier side, pursuant a second perspective, there can also be provided a method for transmitting a model of an asset, the method comprising:
  providing, within a supplier container runtime environment, the model of the asset; wherein the model is an obfuscated containerized model comprising an API, and wherein the supplier container runtime environment is located within a supplier network environment, transmitting, to a container registry, data related to the containerized model;
  wherein the container registry is accessible by a user container runtime environment, located within a user network environment, for receiving an image of the containerized model, the API of the containerized model image being interfacable with a model execution logic via an interface that comprises a process data signal that is transmitted to the API of the model image, and a model result data signal that is transmitted from the API of the model image; the process data signal comprising data related to the usage conditions of the asset, and the model result signal being indicative of the response of the asset to at least some of the usage conditions,
wherein the supplier network environment is isolated from the user network environment.

By combining the receiving and transmitting parts, then viewed from a third perspective there can also be provided a method comprising:
  providing, within a supplier container runtime environment, an obfuscated containerized model of an asset; wherein the containerized model comprises an API, and wherein the supplier container runtime environment is located within a supplier network environment,
  transmitting, to a container registry, data related to the containerized model;
  receiving at a user container runtime environment, via the container registry, a copy of the containerized model;
  interfacing, with a model execution logic, the API of the containerized model image, wherein the interface comprises a process data signal that is transmitted to the API of the model image, and a model result data signal that is transmitted from the API of the model image; wherein the process data signal comprises data related to the usage conditions of the asset, and the model result signal is indicative of the response of the asset to at least some of the usage conditions,
wherein the user container runtime environment is located within a user network environment which is isolated from the supplier network environment.

It will be understood that the containerized model comprises obfuscated model logic (e.g. in C). The API (Application Programming Interface) can e.g., be a standardized API that forwards verified requests to the obfuscated model logic. The API could thus be REST according to OpenA-PI, gRPC, some MQTT preferably with specified and well-documented message bodies depending on model behavior.

It will further be understood that the supplier container runtime environment is executed on a processing unit on the supplier side.

According to an aspect, the API could apply additional means to hide the contents of the containerized model. Such means could, for example, be authentication mechanisms or passing embedded secrets to the obfuscated model binary.

According to another aspect the containerized model also comprises a Machine Learning ("ML") module. In such cases, the interface can also comprise a training data signal for training the containerized model image. By doing so, the ML module if the containerized model image can be trained on the user side by providing user training data to the model image via the training data signal. According to an additional aspect, the interface further comprises a training result signal for receiving training result data from the model image on the user side.

Thus, the model may be, or it may comprise as the ML module, a prediction model that when trained using on the user side by providing the user training data to the model image via the training data signal may result in a user trained data driven model. "Data driven model" refers to a model that is at least partially derived from data, in this case from the user training data that may comprise historical data related to the asset, e.g., a product or equipment. In contrast to a rigorous model that is purely derived using physio-chemical laws, a data driven model can allow describing relations that cannot be modelled by physio-chemical laws. The use of data driven models can allow to describe relations without solving equations from physio-chemical laws, e.g., related to the processes taking place within the respective production process. This can reduce computational power and/or improve speed. Additionally, the supplier may not need to know the specifics of the user to provide such a model usable at the user side.

The data driven model may be a regression model. The data driven model may be a mathematical model. The mathematical model may describe the relation between provided performance properties and determined performance properties as a function.

In some cases, the containerized model may include a supplier trained data driven model, i.e., a model that has been trained using supplier data, such as supplier historical data, from the supplier side. The supplier trained data driven model can provide a more holistic prediction at the user side without requiring to expose the supplier data to the user.

Thus, in the present context, the data-driven model, preferably data-driven machine learning ("ML") model or a merely data-driven model, refers to a trained mathematical model that is parametrized according to the respective training data set, such as supplier historical data and/or user historical data, to reflect reaction kinetics or physio-chemical processes related to the asset properties or production process. An untrained mathematical model refers to a model that does not reflect reaction kinetics or physio-chemical processes, e.g. the untrained mathematical model is not derived from physical law providing a scientific generalization based upon empirical observation. Hence, the kinetic or physio-chemical properties may not be inherent to the untrained mathematical model. The untrained model does not reflect such properties. Feature engineering and training with the respective training data sets enable parametrization of the untrained mathematical model. The result of such training is a merely data-driven model, preferably data-driven ML model, which as a result of the training process, preferably solely as a result of the training process, reflects reaction kinetics or physio-chemical processes related to the respective production processes.

The containerized model may even be a hybrid model. A hybrid model may refer to a model that comprises first-principles parts, so called white box, as well as data-driven parts as explained previously, so called black box. The containerized model may comprise a combination of a white-box-model and a black-box-model and/or a grey-box-model. The white-box-model may be based on physio-chemical laws, for example expressed as equations. The physio-chemical laws may be derived from first principles. The physio-chemical laws may comprise one or more of chemical kinetics, conservation laws of mass, momentum and energy, particle population in arbitrary dimension. The white-box-model may be selected according to the physio-chemical laws that govern the respective production process or parts thereof. The black-box-model may be based on historical data, such as the supplier historical data and/or the user historical data. The black-box-model may be built by using one or more of machine learning, deep learning, neural networks, or other form of artificial intelligence. The black-box-model may be any model that yields a good fit between the training data set and test data. The grey-box-model is a model that combines a partial theoretical structure with data to complete the model.

The trained model may comprise a serial or parallel architecture. In the serial architecture output of the white-box-model may be used as input for the black-box-model or output of the black-box-model may be used as input for the white-box-model. In the parallel architecture a combined output of the white-box-model and the black-box-model may be determined such as by superposition of the outputs. As a non-limiting example, a first sub-model may predict at least one of the performance parameters and/or at least some of the control settings based on a hybrid model with an analytical white-box-model and a data-driven model that serves as a black-box corrector trained on the respective historical data. This first sub-model may have a serial architecture, wherein the output of the white-box-model is input for the black-box-model, or the first sub-model may have parallel architecture. Predicted output of the white-box model may be compared with a test data set comprising a part of historical data. An error between the computed white-box output and test data can be learned by the data-driven model and can then applied for arbitrary predictions. The second sub-model may have a parallel architecture. Other examples can be possible, too.

As used herein, the term "machine learning" or "ML" may refer to a statistical method that enables machines to "learn" tasks from data without explicitly programming. Machine learning techniques may comprise "traditional machine learning"—the workflow in which one manually selects features and then trains the model. Examples of traditional machine learning techniques may include decision trees, support vector machines, and ensemble methods. In some examples, the data driven model may comprises a data driven deep learning model. Deep learning is a subset of machine learning modeled loosely on the neural pathways of the human brain. Deep refers to the multiple layers between the input and output layers. In deep learning, the algorithm automatically learns what features are useful. Examples of deep learning techniques may include convolutional neural networks ("CNNs"), recurrent neural networks such as long short-term memory ("LSTM"), and deep Q networks.

The term "model execution logic" shall be clear as such to those skilled in the art. The term refers to any suitable hardcoded and/or software-based logic that can perform functions as described herein. Dependent upon the model type and the use at the user side, a suitable model execution logic is interfaced with the API of the image. As it was discussed, the model execution logic may be used to provide the process data signal to the model image. Industrial plants can be data heavy environments, so the model execution logic can be used to provide relevant process data to the model image. The model execution logic may also be used for training the containerized model. Furthermore, the model execution logic may also be used to receive the result data signal. Those skilled in the art will fully appreciate that the specifics of the model execution logic are not limiting to the generality of the present teachings.

Similarly, the term API shall be clear to those skilled in the art. API or application programming interface is a computing interface which is used to define interactions between multiple software intermediaries. For example, in the present context, the API is used for interfacing the model image with the model execution logic. The API can further allow preventing exposing the model image on the user side by managing interactions between the model image and the model execution logic.

According to an aspect, the model execution logic receives process data from a process historian (e.g. OSISoft PI) and transmits at least some of the process data via the process data signal to the model image API. The model execution logic then receives process results via the model result signal. At least some of the results can be transmitted back to the process historian, for example for further analysis and/or storage in a database.

The user container runtime environment may be the same type as the supplier runtime environment, or they may be different types yet compatible environments such that the model can be executed on both environments. The presence of a shared environment can further allow for more flexibility between the user runtime environment and the supplier runtime environment. The term "runtime environment" shall be clear as such to those skilled in the art. However, as an example, the term may refer to a system or framework that provides an environment in which computer programs can run.

The term "network environment" shall also be clear as such to those skilled in the art. However, as an example, the term may refer to a system, framework or infrastructure that comprises one or more data networks. any suitable kind of data transmission medium, wired, wireless, or their combination. A specific kind of network is not limiting to the scope or generality of the present teachings. The network can hence refer to any suitable arbitrary interconnection between at least one communication endpoint to another communication endpoint. Network may comprise one or more distribution points, routers or other types of communication hardware. The interconnection of the network may be formed by means of physically hard wiring, optical and/or wireless radio-frequency methods. The network specifically may be or may comprise a physical network fully or partially made by hardwiring, such as a fiber-optical network or a network fully or partially made by electrically conductive cables or a combination thereof.

A containerized model proposed herein may be realized by a virtualized machine environment such as those using Operating System ("OS") level virtualization. According to an aspect, the containerized model is realized using a container, for example a Docker container. A container is software package that often bundle its own software, libraries and configuration files. A container is usually isolated from other containers, but the containers can communicate with each other through well-defined channels.

The applicant has further realized that the present teachings can be particularly suitable for application in a value chain or even in serial production where an asset, or product, which is produced by a first plant is used by a second plant. As discussed earlier, by providing a model of the product to the second plant, the second plant can better adapt the production or process that utilizes the product according to the properties of the product that has been supplied to the second plant. This can result in one or more of: reduced costs, reduced wastage, and improved quality of the overall process involving the first and the second plant. Those skilled in the art will appreciate that the number of plants in the value chain can be more than two. Or more generally, a user may be a supplier for another user downstream of the value chain, and so forth.

Industrial plants, or simply plants, comprise infrastructure that is used for an industrial purpose. The industrial purpose may be manufacturing of one or more products, i.e., process manufacturing done by a process plant. The product can, for example, be any product, such as a: chemical, biological, pharmaceutical, food, beverage, textile, metal, plastic, semiconductor. Accordingly, the plant can be any or more of the: chemical plant, pharmaceutical plant, fossil fuel facility such as oil and/or natural gas well, refinery, petrochemical plant, cracking plant, fracking facility, and such. The product may even be an intermediate product which is used to produce an end-product, either in the same plant or by a user downstream of the value chain. The plant can even be any of the: distillery, incinerator, or power plant. The plant can even be a combination of any of the above, for example, the plant may be a chemical plant that includes a cracking facility such as a steam cracker, and/or a power plant. Those skilled in the art will appreciate that the plant also comprises instrumentation that can include several different types of sensors for monitoring the plant parameters and equipment. At least part of the process data is generated via the instrumentation such as sensors.

Thus, according to an aspect of the model receiving side, the method also comprises:
  interfacing, with an API of an obfuscated containerized user model, the API of the containerized model image.

The interface between the API of the model image and the API of the user model can thus be used for creating a model for the asset that is to be provided to an another user.

According to an aspect, the user model and the model image are contained in a user container composition. The user container composition is a well-defined set of containers that are specified to interact with each other in a certain way via the interface. The container composition can, for example, be a docker-compose file or a kubernetes deploy manifest.

Thus, more specifically, there can also be provided a method comprising:
  receiving at a user container runtime environment, via a container registry, an image of an obfuscated containerized model of an asset; wherein the containerized model comprises an API, and wherein the containerized model has been generated in a supplier runtime environment located within a supplier network environment,
  interfacing, with a model execution logic, the API of the containerized model image, wherein the interface comprises a process data signal that is transmitted to the API of the model image, and a model result data signal that is transmitted from the API of the model image; wherein the process data signal comprises data related to the usage conditions of the asset, and the model result signal is indicative of the response of the asset to at least some of the usage conditions,
  interfacing, via an API of an obfuscated containerized user model, the API of the containerized model image;
wherein the user container runtime environment is located within a user network environment which is isolated from the supplier network environment.

Thus, for an intermediate user in a value-chain, there can also be provided a method for transmitting an augmented model comprising:

providing, within an intermediate user container runtime environment, a model image of an asset; wherein the model image is an obfuscated containerized model comprising an API, which model image has been received from a supplier container runtime environment via a container registry, and wherein the intermediate user container runtime environment is located within an intermediate user network environment, providing, within the intermediate user container runtime environment, an obfuscated containerized intermediate user model; the containerized intermediate user model also comprising an API, interfacing, via the API of an obfuscated containerized intermediate user model, the API of the containerized model image, such that the augmented model is realized; wherein the augmented model is representative an intermediate user asset that has been created using the asset;

transmitting, to an intermediate user container registry, data related to the augmented model;

wherein the intermediate user container registry is accessible by a downstream user container runtime environment, located within a downstream user network environment, for receiving an image of the augmented model, the API of the augmented model image being interfacable with an augmented model execution logic via an interface that comprises a downstream user process data signal that is transmitted to the API of the augmented model image, and a downstream user model result data signal that is transmitted from the API of the augmented model image; the downstream user process data signal comprising data related to the usage conditions of the intermediate user asset, and the downstream user model result signal being indicative of the response of the intermediate user asset to at least some of the usage conditions, wherein the supplier network environment, the intermediate user network environment, and the downstream user network environment are isolated from each another.

The intermediate user container registry and the container registry can either be the same registry which are located in a shared environment, or they may be different registries that are either located in the same shared environment, or in different environments shared between the supplier and the intermediate user, and between the intermediate user and the downstream user respectively.

According to an aspect, a downstream user model execution logic is interfaced to the API of the augmented model image, either via the API of the intermediate user model, or via the API of the user model comprised in the augmented model image. The downstream user can then pass downstream user process data to the augmented model image similar to as was explained earlier. Similarly, the interface may also comprise a downstream model result signal. Similarly, there can also be provided a downstream training data signal for training the augmented model image. According to an additional aspect, there can also be provided a downstream training result signal for receiving training result data from the augmented model image on the downstream user side.

An advantage of the above teachings can be that the intermediate user can pass process data to the API of the of the containerized model image and use the model results to evaluate performance at their end without needing to pass proprietary data to the downstream user. The downstream user can still benefit from the augmented model which comprises both the model of the asset as well as the contribution from the intermediate user.

Similar approach may be applied for receiving and transmitting models for multiple users within the supply chain.

When viewed from another perspective, there can also be provided a computer program comprising instructions which, when the instructions are executed by a suitable computer processor, cause the processor to carry out the method steps herein disclosed. There can also be provided a non-transitory computer readable medium storing a program causing a suitable computer processor to execute any method steps herein disclosed.

A computer-readable data medium or carrier includes any suitable data storage device on which is stored one or more sets of instructions (e.g., software) embodying any one or more of the methodologies or functions described herein. The instructions may also reside, completely or at least partially, within the main memory and/or within the processor during execution thereof by the computer system, main memory, and processing device, which may constitute computer-readable storage media. The instructions may further be transmitted or received over a network via a network interface device.

The computer program for implementing one or more of the embodiments described herein may be stored and/or distributed on a suitable medium, such as an optical storage medium or a solid state medium supplied together with or as part of other hardware, but may also be distributed in other forms, such as via the internet or other wired or wireless telecommunication systems. However, the computer program may also be presented over a network like the World Wide Web and can be downloaded into the working memory of a data processor from such a network.

When viewed from another perspective, a data carrier or a data storage medium for making a computer program element available for downloading can be also provided, which computer program element is arranged to perform a method according to one of the previously described embodiments.

There can even to provided one or more systems for monitoring and/or controlling a plant equipment at an industrial plant, the industrial plant also comprising at least one computer processor which is configured to perform any of the method aspects herein disclosed.

The word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

Example embodiments are described hereinafter with reference to the accompanying drawings.

DETAILED DESCRIPTION

Figure 1:
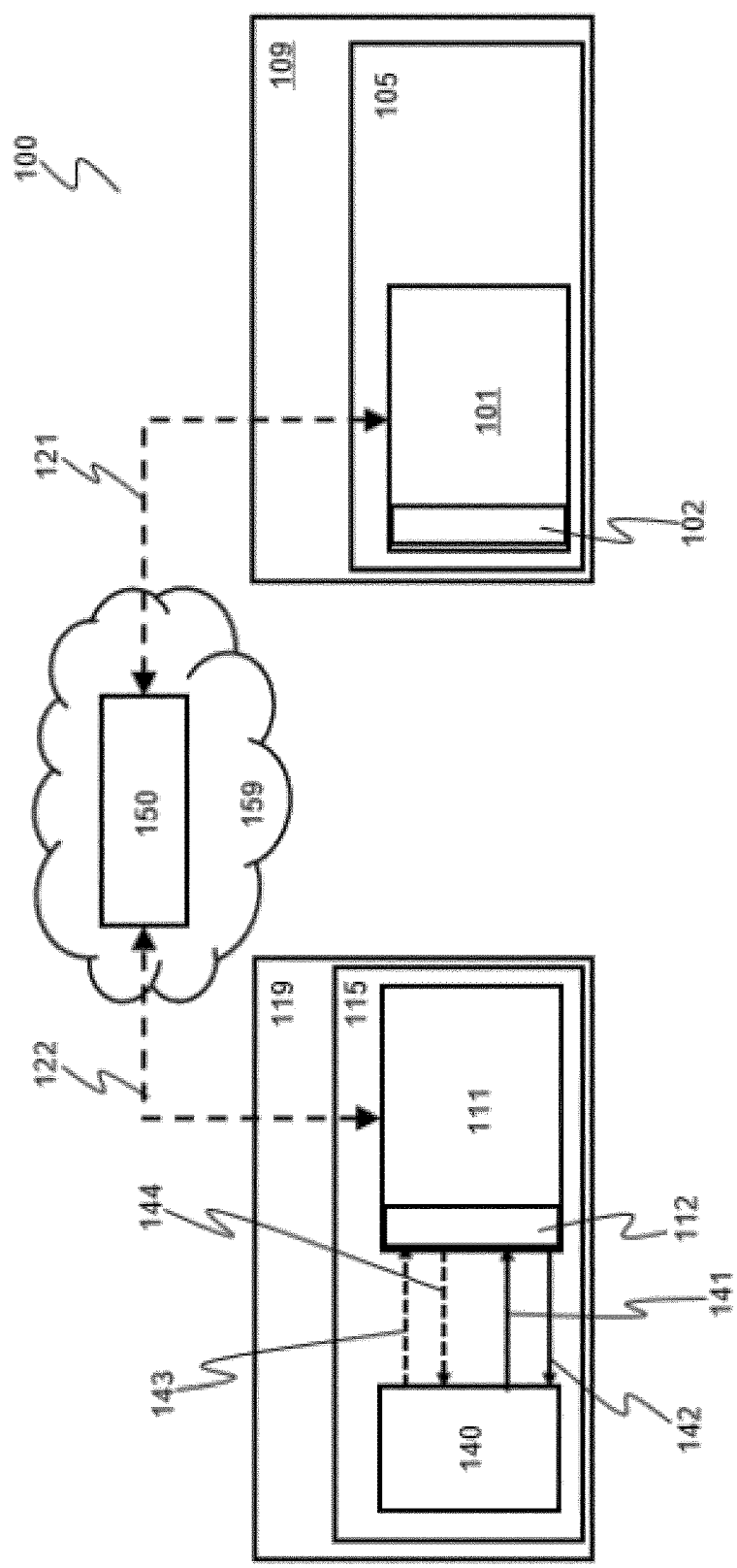
FIG. 1 shows a block-diagram of a network arrangement

FIG. 1 shows a network arrangement 100 pursuant to an aspect of the teachings. In the arrangement 100, for the sake of understanding, the receiving and transmitting parts are shown together. The method aspects will be explained below with reference to the network arrangements.

The arrangement 100 comprises a containerized model 101 which is provided within a supplier container runtime environment 105. The supplier container runtime environment 105 is located within a supplier network environment 109. The supplier network environment 109 in some cases may be referred to as belonging to the supplier side. Supplier is used to refer to the party that has developed the model 101 and/or is interested in securing the logic of the model 101 from being exposed to third parties.

The arrangement 100 also comprises a container registry 150 which is located in a shared environment 159. In this example, the shared environment 159 is shown as a part of a cloud service. However, the shared environment 159 in some cases may even be realized on the supplier side. Via a supplier communication link 121, data related to the model 101 can be provided to the container registry 150. The data may either be an image or copy of the model 101, and/or it may be one or more flags indicating that a new version of the model 101 is available on the supplier side. It will be understood that a communication link may be a network connection, either wired or wireless. Accordingly, the communications link may be at least partially be an internet connection, or in some cases it may even be an intranet connection. The supplier communication link 121 may even be a mobile network supporting computer data transfer. The communication via the supplier communication link 121 may even be via a secure connection such as a Virtual Private Network (VPN") connection.

The containerized model 101 may be obfuscated for security, either within the supplier container runtime environment 105, or when transmitting data to or via the container registry 150. The containerized model 101 also comprises an API 102.

On the user side, it is shown provided within a user container runtime environment 115 an image 111 of the model 101. The image 111 is an obfuscated containerized model image that has been transmitted via the container registry 150 through a user communication link 122. Similar to the supplier communication link 121, the user communication link 122 may even be either wired and/or wireless. Accordingly, the user communications link 122 may also be at least partially be an internet connection, or in some cases it may even be an intranet connection. The user communication link 122 may even be a mobile network supporting computer data transfer. The communication via the user communication link 122 may even be via a secure connection such as a Virtual Private Network (VPN") connection.

The model image 111 also comprises a model image API 112 that is a copy of the model API 102. The model image API 112 is provided with an interface that comprises a process data signal 141 and a model result signal 142. The process data signal 141 is used to send data related to usage conditions of an asset. The asset is usually on the user side, so the user is often reluctant to share process data generated by the asset with third parties. The process data often contains valuable information about the asset and the plant that comprises the asset. Such information can, for example, be used to optimize the performance of the asset and/or the plant, which can be used by the user for lowering costs and/or improving quality of products manufactured by the asset or the plant. The model result signal 142 can provide such estimation of performance by indicating the response of the asset to at least some of the usage conditions as specified by the process data signal 141. The user container runtime environment 115 is located within a user network environment 119 which is isolated from the supplier network environment 109, i.e., the network environments 109 and 119 are isolated from each another. Being isolated means that resources on either network environments 109 and 119 do not have access rights to the other of the network environments.

The proposed architecture and method of transmitting and/or receiving the model can thus allow improved security for the supplier and the user for their proprietary intellectual property. As a result, the supplier can provide a better model for the user's purpose and the user can use the model with both parties enjoying better security.

The process data signal 141 and the model result signal 142 are handled by a model execution logic 140, which the user can specify for feeding process data to the model image 111 and interpreting model results.

Optionally, the interface may also comprise a training data signal 143 and a training result signal 144. The training data signal 143 may be used for training the model image 111 by providing training data on the user side. The training data can for example be historical data related to the asset, which is used to train a machine learning module in the model image 111. The training result signal 144 may be used for receiving training result data from the model image 111. The user can thus better adapt the model image 111 for modeling the asset on the user side. The training signals 143 and 144 can also be handled, as shown, via the model execution logic 140.

Figure 2:
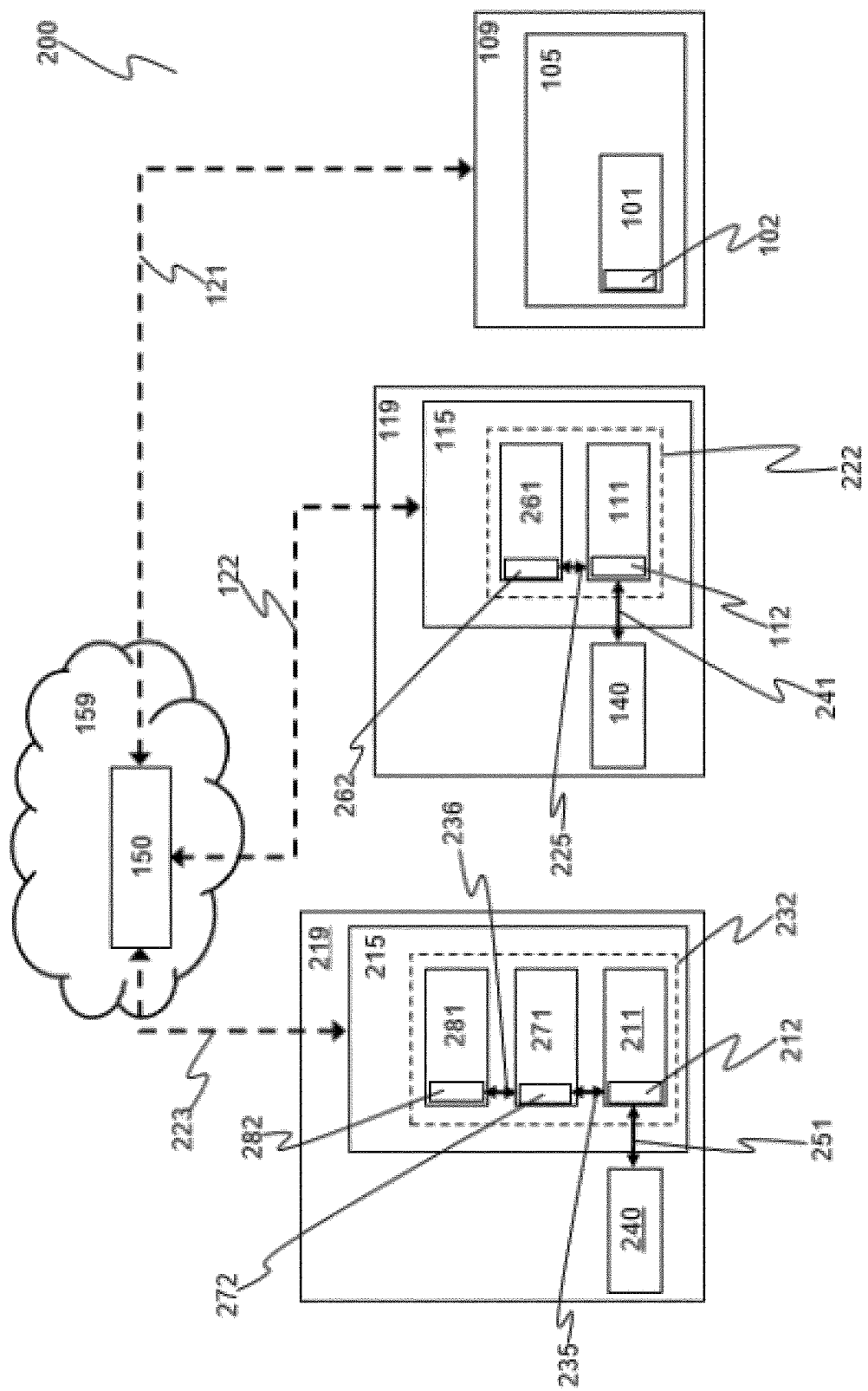
FIG. 2 shows a block-diagram of a network arrangement applied to a supply chain

FIG. 2 shows another network arrangement 200 pursuant to the present teachings. Also in this example, for the sake of understanding, the receiving and transmitting parts are shown together, which will also be used to explain the method aspects. Further, for simplicity the reference numbers from FIG. 1 are reused to refer to the components that can be the same as, or are similar to, those in the supplier-user example shown in FIG. 1. Notably, the containerized model 101 which is shown provided within the supplier container runtime environment 105. The supplier container runtime environment 105 is located within the supplier network environment 109. Moreover, the container registry 150 is shown as a common registry located in the shared environment 159 in cloud. As it was discussed previously, the registry may even be split between sections of the supply chain, i.e., specific user-supplier groups. Also, the shared environment 159 may either be a common environment as shown or different environments for different groups.

It will be appreciated that the user network environment 119 in FIG. 2 can be considered as an intermediate user network environment. The image 111 of the containerized model 101 is shown provided in the user container runtime environment, which here can be referred to as an intermediate user container runtime environment 115. The intermediate user container runtime environment 115 is located within the intermediate user network environment 119. The is isolated from the supplier network environment 109. The intermediate user model execution logic 140 can be interfaced with the model image 111 for signals such as process- and/or training-data and results. The signals are not shown individually in FIG. 2, rather in a form of an intermediate logic bus 241.

The intermediate user may be using the asset for producing an intermediate user asset, for example by using the asset as a starting point for manufacturing the intermediate user asset. For providing visibility to the downstream value chain, or other users, the intermediate user can create an augmented model 222. The augmented model 222 comprises the model image 111 and an obfuscated containerized intermediate user model 261. The obfuscated containerized intermediate user model has an intermediate API 262 that is used to interface the containerized intermediate user model 261 with the model image 111, for example via an intermediate model data signal 225. The augmented model 222 may be comprised in a container composition.

The intermediate user may transmit the augmented model 222 via an intermediate user container registry, which in the example of FIG. 2 is shown as being the same as the container registry 150.

A downstream user can which has access to the shared registry 150 can be provided an image of the augmented model 222 via a downstream communications link 223. The communication links were explained earlier with reference to FIG. 1. The downstream can optionally append the model further by creating a further augmented model 232. This may be the case when the downstream user wants to provide the further augmented model 232 to another user, for example, another downstream user. The further augmented model 232 comprises an image of the augmented model 222, which is shown as model images 211 and 271 that correspond to containerized model image 111 and the containerized intermediate user model 261 respectively. The model images 211 and 271 are interfaced by signal 235 which corresponds to the intermediate model data signal 225. The downstream user creates a containerized downstream user model 281 which is interfaced via its API 282 to the augmented model image via a downstream model data signal 236. The further augmented model 232 is provided in a downstream container runtime environment 215 which is located within a downstream user network environment 219.

A downstream logic bus 251 is shown, which may be similar to the intermediate logic bus 241 as discussed previously. Thus, the corresponding downstream process data signal and downstream model result signal in the downstream logic bus 251 may be handled by a downstream model execution logic 240. The downstream model execution logic 240 may be different from the model execution logic 140, or they may be similar. Similarly, the downstream model image 211 also comprises a downstream model image API 212 that may be a copy of the model API 102.

In cases where the supplier network environment 109, the intermediate user network environment 119, and the downstream user network environment 219 need to be isolated from each another, the proposed teachings can provide a secure way to provide models within a value chain.

It will be appreciated that in cases when the downstream user does not require to provide a model to other users, the further augmented model 232 can just be an image of the augmented model 222.

It will be appreciated that the model image and model execution logic on the respective sides (i.e., user side, intermediate user side, or downstream user side) are being executed on a processing unit, which can either be the same processor or a distributed processing environment. Similarly, on the supplier side, the containerized model is generated using a processing unit on the supplier side. A specific architecture of the processing units is not essential to the scope or generality of the present teachings.

Figure 3:
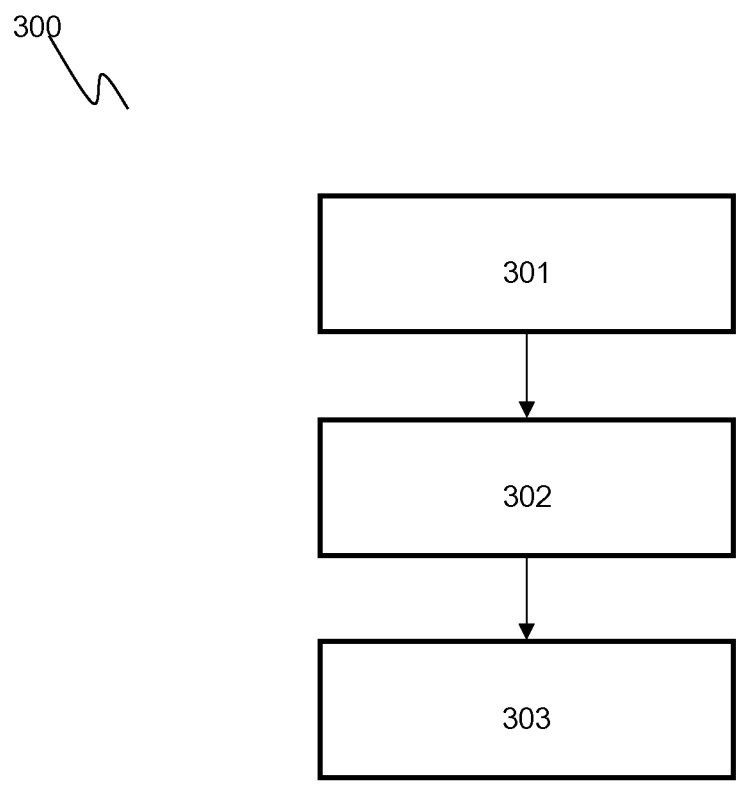
FIG. 3 shows a flow-chart depicting certain aspects of the present teachings

FIG. 3 shows a flow chart 300 pursuant to the present teachings, e.g., illustrating a computer routine. In block 301, it is received at the user container runtime environment 115 the image 111 of an obfuscated containerized model of an asset. The image 111 is provided via the container registry 150, which may be a part of the shared environment 159. The containerized model 101 comprises an API 102, so the image 111 also comprise an API 112. The containerized model 101 has been generated in the supplier runtime environment 105 located within the supplier network environment 109. In block 302, it is interfaced with the model execution logic 140 the API 112 of the containerized model image 111. The interface comprises the process data signal 141 that is transmitted to the API 112 of the model image 111, and the model result data signal 142 that is transmitted from the API 112 of the model image 111. The process data signal 141 comprises data related to the usage conditions of the asset, and the model result signal 142 is indicative of the response of the asset to at least some of the usage conditions. The user container runtime environment 115 is located within the user network environment 119 which is isolated from the supplier network environment 109. Optionally, in block 303, the result signal 142 is used to determine operating conditions for the asset, which operating conditions may be used to determine one or more control settings for the asset. For example, the control settings may be used to operate the asset for achieving optimized operating conditions, or the control settings may be related to processing the asset in an optimized manner, for example for achieving a desired performance of the asset. Accordingly, the asset may be a product such as a chemical product, or the asset may be an equipment.

A similar flow-chart may be obtained for the supplier side when following the method aspects as discussed in the present disclosure. For example, in a first step it can be provided within the supplier container runtime environment 105, the model 101 of the asset. The model 101 is an obfuscated containerized model comprising the API 102. As a second step, it is transmitted to the container registry 150 data related to the containerized model 101. The container registry 150 is accessible by a user container runtime environment 115 located within a user network environment 119. The container registry 150 is used for receiving the image 111 of the containerized model. The API 112 of the containerized model image 111 is interfacable with the model execution logic 140 via the interface that comprises the process data signal 141 that is transmitted to the API 112 of the model image 111, and a model result data signal 142 that is transmitted from the API 112 of the model image 111. The model result signal 142 is indicative of the response of the asset to at least some of the usage conditions.

The supplier and user aspects may be combined as was shown.

Various examples have been disclosed above for a method for sending and receiving an asset model, a computer network, and a computer software product implementing any of the relevant method steps herein disclosed. Those skilled in the art will understand however that changes and modifications may be made to those examples without departing from the spirit and scope of the accompanying claims and their equivalents. It will further be appreciated that aspects from the method and product embodiments discussed herein may be freely combined.

Certain example embodiments of the present teachings are summarized in the following clauses.

Clause 1

A method or computer-implemented method comprising:
receiving at a user container runtime environment, via a container registry, an image of an obfuscated containerized model of an asset; wherein the containerized model comprises an API, and wherein the containerized model has been generated in a supplier runtime environment located within a supplier network environment, interfacing, with a model execution logic, the API of the containerized model image, wherein the interface comprises a process data signal that is transmitted to the API of the model image, and a model result data signal that is transmitted from the API of the model image; wherein the process data signal comprises data related to the usage conditions of the asset, and the model result signal is indicative of the response of the asset to at least some of the usage conditions, wherein the user container runtime environment is located within a user network environment which is isolated from the supplier network environment.

Clause 2

A method or computer-implemented method for transmitting a model of an asset, the method comprising:

providing, within a supplier container runtime environment, the model of the asset; wherein the model is an obfuscated containerized model comprising an API, and wherein the supplier container runtime environment is located within a supplier network environment, transmitting, to a container registry, data related to the containerized model;

wherein the container registry is accessible by a user container runtime environment, located within a user network environment, for receiving an image of the containerized model, the API of the containerized model image being interfacable with a model execution logic via an interface that comprises a process data signal that is transmitted to the API of the model image, and a model result data signal that is transmitted from the API of the model image; the process data signal comprising data related to the usage conditions of the asset, and the model result signal being indicative of the response of the asset to at least some of the usage conditions, wherein the supplier network environment is isolated from the user network environment.

Clause 3

The method according to clause 1 or clause 2, wherein the asset is a piece of equipment.

Clause 4

The method according to clause 1 or clause 2, wherein the asset is a chemical product.

Clause 5

The method according to any of the above clauses, wherein the container registry is located within a shared network environment.

Clause 6

The method according to any of the above clauses, wherein the containerized model also comprises a Machine Learning ("ML") module.

Clause 7

The method according to clause 1, wherein the model execution logic receives process data from a process historian and transmits at least some of the process data via the process data signal to the model image API.

Clause 8

The method according to clause 1, wherein the method further comprises:

interfacing, with an API of an obfuscated containerized user model, the API of the containerized model image.

Clause 9

The method according to clause 8, wherein the user model and the model image are contained in a user container composition.

Clause 10

A method or computer-implemented method for transmitting an augmented model comprising:

providing, within an intermediate user container runtime environment, a model image of an asset; wherein the model image is an obfuscated containerized model comprising an API, which model image has been received from a supplier container runtime environment via a container registry, and wherein the intermediate user container runtime environment is located within an intermediate user network environment, providing, within the intermediate user container runtime environment, an obfuscated containerized intermediate user model; the containerized intermediate user model also comprising an API, interfacing, via the API of an obfuscated containerized intermediate user model, the API of the containerized model image, such that the augmented model is realized; wherein the augmented model is representative an intermediate user asset that has been created using the asset;

transmitting, to an intermediate user container registry, data related to the augmented model;

wherein the intermediate user container registry is accessible by a downstream user container runtime environment, located within a downstream user network environment, for receiving an image of the augmented model, the API of the augmented model image being interfacable with an augmented model execution logic via an interface that comprises a downstream user process data signal that is transmitted to the API of the augmented model image, and a downstream user model result data signal that is transmitted from the API of the augmented model image; the downstream user process data signal comprising data related to the usage conditions of the intermediate user asset, and the downstream user model result signal being indicative of the response of the intermediate user asset to at least some of the usage conditions, wherein the supplier network environment, the intermediate user network environment, and the downstream user network environment are isolated from each another.

Clause 11

The method according to clause 10, wherein the intermediate user container registry and the container registry are the same registry.

Clause 12

The method according to clause 10, wherein the intermediate user container registry and the container registry are different registries that are either located in the same shared environment, or in different environments.

Clause 13

The method according to any of the above clauses, wherein the method also comprises:
performing, in response to the model result data signal, at least one control operation on or via the asset.

Clause 14

A system comprising at least one computer processor which is configured to carry out the method steps of any of the clauses 1-13.

Clause 15

A computer program product comprising instructions which, when executed by a suitable computer processor, cause the processor to carry out the method steps of any of the clauses 1-13.

The invention claimed is:

1. A method comprising:
receiving at a user container runtime environment, via a container registry, an image of an obfuscated containerized model of an asset; wherein the obfuscated containerized model comprises an Application Programming Interface ("API"), and wherein the obfuscated containerized model has been generated in a supplier runtime environment located within a supplier network environment,
interfacing, with a model execution logic, the API of the image of the obfuscated containerized model, wherein an interface comprises a process data signal that is transmitted to the API of the image, and a model result data signal that is transmitted from the API of the image; wherein the process data signal comprises data related to usage conditions of the asset, and the model result signal is indicative of the response of the asset to at least some of the usage conditions,
wherein the user container runtime environment is located within a user network environment which is isolated from the supplier network environment.

2. A method for transmitting a model of an asset, the method comprising:
providing, within a supplier container runtime environment, the model of the asset; wherein the model is an obfuscated containerized model comprising an Application Programming Interface ("API"), and wherein the supplier container runtime environment is located within a supplier network environment,
transmitting, to a container registry, data related to the obfuscated containerized model;
wherein the container registry is accessible by a user container runtime environment, located within a user network environment, for receiving an image of the obfuscated containerized model, the API of the image of the obfuscated containerized model being interfacable with a model execution logic via an interface that comprises a process data signal that is transmitted to the API of the image of the obfuscated containerized model, and a model result data signal that is transmitted from the API of the model image; the process data signal comprising data related to usage conditions of the asset, and the model result signal being indicative of the response of the asset to at least some of the usage conditions,
wherein the supplier network environment is isolated from the user network environment.

3. The method according to claim 1, wherein the asset is a piece of equipment.

4. The method according to claim 1, wherein the asset is a chemical product.

5. The method according to claim 1, wherein the container registry is located within a shared network environment.

6. The method according to claim 1, wherein the containerized model also comprises a Machine Learning ("ML") module.

7. The method according to claim 1, wherein the model execution logic receives process data from a process historian and transmits at least some of the process data via the process data signal to the model image API.

8. The method according to claim 1, wherein the method further comprises:
interfacing, with an API of an obfuscated containerized user model, the API of the containerized model image.

9. The method according to claim 8, wherein the user model and the model image are contained in a user container composition.

10. A method for transmitting an augmented model comprising:
providing, within an intermediate user container runtime environment, a model image of an asset; wherein the model image is an obfuscated containerized model comprising an Application Programming Interface ("API"), which model image has been received from a supplier container runtime environment located within a supplier network via a container registry, and wherein the intermediate user container runtime environment is located within an intermediate user network environment,
providing, within the intermediate user container runtime environment, an obfuscated containerized intermediate user model; the containerized intermediate user model also comprising an API,
interfacing, via the API of an obfuscated containerized intermediate user model, the API of the containerized model image, such that the augmented model is realized; wherein the augmented model is representative an intermediate user asset that has been created using the asset;
transmitting, to an intermediate user container registry, data related to the augmented model;
wherein the intermediate user container registry is accessible by a downstream user container runtime environment, located within a downstream user network environment, for receiving an image of the augmented model, the API of the image of the augmented model being interfacable with an augmented model execution logic via an interface that comprises a downstream user process data signal that is transmitted to the API of the image of the augmented model, and a downstream user model result data signal that is transmitted from the API of the image of the augmented model; the downstream user process data signal comprising data related to usage conditions of the intermediate user asset, and the downstream user model result signal being indicative of the response of the intermediate user asset to at least some of the usage conditions, wherein the supplier network environment, the intermediate user network environment, and the downstream user network environment are isolated from each another.

11. The method according to claim 10, wherein the intermediate user container registry and the container registry are the same registry.

12. The method according to claim 10, wherein the intermediate user container registry and the container registry are different registries that are either located in the same shared environment, or in different environments.

13. The method according to claim 1, wherein the method also comprises:
performing, in response to the model result data signal, at least one control operation on or via the asset.

14. A system comprising at least one computer processor which is configured to carry out the method steps of claim 1.

15. A non-transitory computer program product comprising instructions which, when executed by a suitable computer processor, cause the processor to carry out the method steps of claim 1.

\* \* \* \* \*